United States Patent [19]

Farley

[11] Patent Number: 5,573,256
[45] Date of Patent: Nov. 12, 1996

[54] SLED PANTS

[76] Inventor: Brent L. Farley, 4213 Conneticut Ave., Baltimore, Md. 21229

[21] Appl. No.: 452,031

[22] Filed: May 26, 1995

[51] Int. Cl.⁶ .................................................. B62B 15/00
[52] U.S. Cl. ................... 280/18; 280/20; 280/845
[58] Field of Search ...................... 280/845, 14.1, 280/15, 18, 20, 28, 28.16

[56] References Cited

U.S. PATENT DOCUMENTS

| 1,552,603 | 9/1925 | Hawks | 441/65 |
| 3,199,887 | 8/1965 | McKelvey | 280/18 |
| 3,372,944 | 5/1966 | Lauritzen | 280/20 |
| 3,625,533 | 12/1971 | Boe | 280/18 |
| 3,799,566 | 3/1974 | Thompson | 280/20 |
| 3,866,932 | 2/1975 | Milicevic | 280/845 |
| 3,884,490 | 5/1975 | Hellman | 280/18 |
| 4,294,457 | 10/1981 | Thiboutot | 280/20 |
| 4,378,445 | 4/1983 | Monreal | 280/18 |
| 4,573,695 | 3/1986 | Kennel | 280/20 |
| 4,603,870 | 8/1986 | Monreal | 280/18 |
| 4,735,423 | 4/1988 | Foss | 280/18 |
| 4,909,524 | 3/1990 | Paine | 280/18 |
| 5,253,885 | 10/1993 | McCracken et al. | 280/20 |

FOREIGN PATENT DOCUMENTS

| 1964299 | 6/1971 | Germany | 280/18 |
| 1188038 | 10/1985 | U.S.S.R. | 280/20 |

Primary Examiner—Anne Marie Boehler
Assistant Examiner—Min Yu

[57] ABSTRACT

A sled worn on the body during sledding. The sled comprises a seat component and a leg component, both of which are ergonomically configured to correspond to the shape of the human body. The leg component is pivotally attached to the seat component to enable it to reciprocate from an upward walking position to a downward sledding position. The leg component includes an upturned distal portion to allow the device to ride over small obstacles and bumps in the sledding path.

15 Claims, 1 Drawing Sheet

U.S. Patent   Nov. 12, 1996   5,573,256
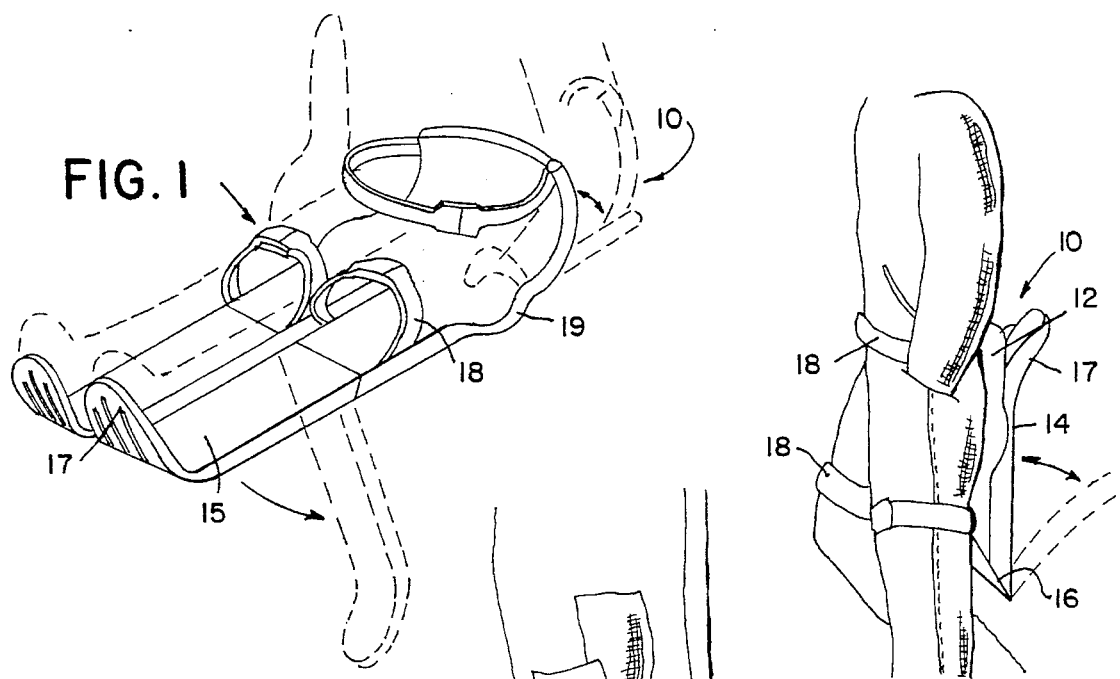
FIG. 1
FIG. 2
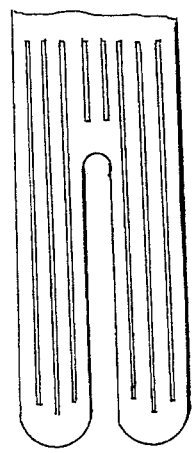
FIG. 5
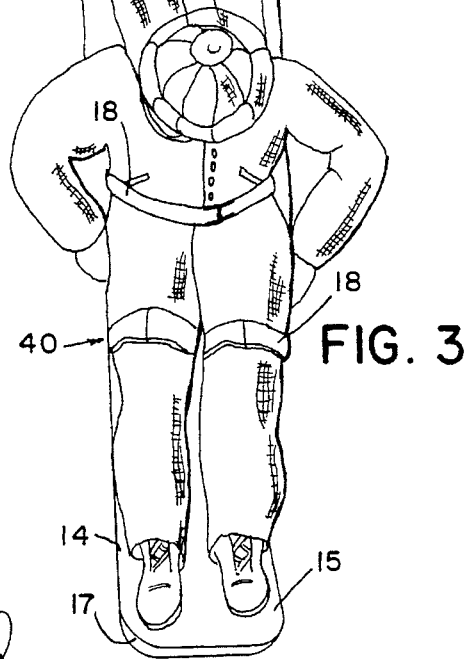
FIG. 3
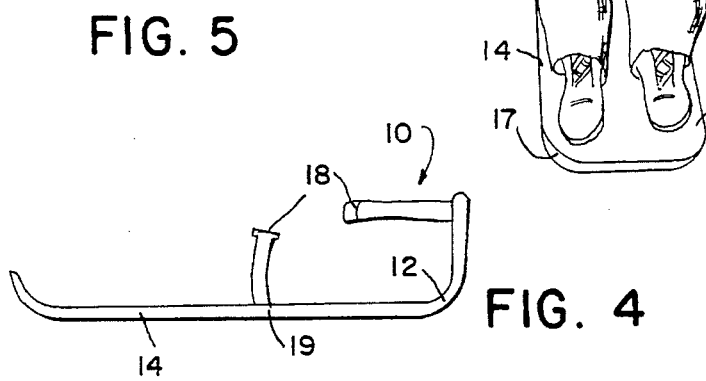
FIG. 4

SLED PANTS

BACKGROUND OF THE INVENTION

1. Field of the Invention

The present invention relates generally to sleds and toboggans, but more particularly to such devices capable of being worn on the body of the user while sledding or tobogganing.

2. Description of the Related Art

In areas where sledding and tobogganing down a hillside is part of winter enjoyment, it is particularly burdensome on the individual to drag or carry a sled or toboggan (hereinafter "sled(s)") to the top of a hill after a long down hill run. The effort expended dragging or carrying the sled is known to be tiresome and detracts from the enjoyment of the sledding activity.

Depending upon the geometry and configuration of the sled, the work associated with dragging or carrying the sled can differ. For example, some individuals prefer to go sledding with a simple sheet of cardboard; while others use a saucer or dish-like sled and some use a conventional sled with runners as their sled of choice.

Until now, a sled capable of being attached to the body of the user and worn before, during, and after a downhill sled run, has not been invented.

SUMMARY OF THE INVENTION

The preferred embodiment of the present invention incorporates an ergonomically contoured seat component to which a pivotal leg component is attached. The seat component attaches to the seat portion of the body of the user by a plurality of attachment bands which are designed to encircle each leg of the wearer, and in some cases the waste. In use, the pivoting leg portion is may also be fastened to the user's legs by attachment bands.

The seat portion preferably covers the lower back, buttocks, and rear portion of the thighs of the wearer. The pivoting leg portion attaches to and pivots with respect to the seat portion. The pivot is positioned at or near the back of the knee of the wearer. In this fashion, the sled may be attached to the lower body of the user, and the pivoting leg potion may be placed in the operative down position while sledding. After the run is complete, the user may simply fold the pivoting leg portion upward to lie against the exterior surface of the seat portion. With the lower leg portion folded up or back, the user may walk more easily. Once the user has reached the top of the hill, he prepares for another run simply by folding the leg portion down into the operative leg covering position.

The pivoting leg portion has a proximal pivoting end and a distal end opposite the pivoting end. The distal end is preferably curved upward in a manner similar to the front end of a toboggan, or runners of a snow sleigh. The upturned end is preferred in order to ride over small hills and bumps (moagles) along the sledding path in much the same way as the toboggan. The preferred configuration of the pivoting leg portion corresponds generally to the shape of the wearer's leg in that it may have two leg receiving troughs or a single leg receiving trough sized to receive both legs at the same time. The leg receiving troughs may therefore be formed in the same piece of structure (two leg embodiment) or be a pair of tandem single independent pivoting leg structures.

The present invention may be summarized in a variety of ways, one of which is the following: an apparatus to be worn during sledding comprising: a seat portion; a leg portion having a first end pivotally attached to the seat portion and a second curved end opposite the first, wherein the first end enables the leg portion to reciprocate between an operable sledding position and a walking position, and the second end enables the leg portion to ride over protuberances associated with the path of travel while sledding.

The leg portion and seat portion have an interior surface contour corresponding to the shape of the body of the wearer. The leg portion may further include at least one leg trough for receiving a leg of the user. At least one attachment strap is provided to enable the seat portion to be attached to the body of the wearer. The at least one attachment strap may comprise a plurality of attachment straps configured to overlie the leg of the wearer and hold the seat portion adjacent the wearer's body.

The present invention may also be summarized as follows: an apparatus to be worn during sledding comprising: a seat component; a leg component having at least one trough for receiving a leg of the wearer; and a pivot enabling the leg component to be pivotally attached to the seat component and reciprocate between an operable sledding position and a walking position.

The leg component may further include a curved end opposite the end pivotally attached to the set component enabling the leg component to ride over protuberances associated with the path of travel while sledding, and the leg component and seat component have an interior surface contour corresponding to the shape of the body of the wearer. The leg component may further include a pair of troughs.

The present invention may also be summarized as follows: a flexible sled configured like pants, comprising: a seat; a pair of spaced apart legs attached to the seat; and a pair of attachment straps provided to attach the sled to the body of a user. The seat and legs may form a single component and be made of a flexible resilient material. The legs may further include a curved end opposite the seat enabling the legs to ride over protuberances associated with the path of travel while sledding, and the legs and seat may have an interior surface contour corresponding to the shape of the body of the wearer.

It is an object of the present invention to provide a device which can be worn during sledding and tobogganing.

It is an object of the present invention to provide a device having a seat portion and a pivoting leg portion enabling the user to wear the device to the snow hill and extend the leg portion for sledding.

It is an object of the present invention to provide a device ergonomically contoured to be worn by a person while sledding and tobogganing.

These and other objects, features and advantages shall become apparent after consideration of the scope of the specification and claims. All such objects, features and advantages are believed to be within the scope of the present invention even though not specifically set forth herein.

BRIEF DESCRIPTION OF THE DRAWINGS

FIG. 1 is an elevated perspective view of a preferred embodiment of the invention shown attached to the body of the user and illustrating the pivoting feature of the leg component by the dashed lines;

FIG. 2 is an elevated perspective view of the embodiment of the present invention shown in a walking or rest position with the leg portion pivoted upward;

FIG. 3 is an elevated perspective view of an embodiment of the present invention shown with a single leg portion pivoted downward in a sledding orientation;

FIG. 4 is a side view of a preferred embodiment of the present invention; and

FIG. 5 is a bottom plan view of the embodiment shown in FIG. 1.

DETAILED DESCRIPTION OF THE PREFERRED EMBODIMENT(S)

With reference to FIGS. 1–3, the preferred embodiments of the present invention is designated generally by the reference numerals 10 and 40. Embodiments 10 and 40 are preferably constructed of a plastic, polymer or other suitable durable and resilient material, and typically comprises a seat portion 12 and a leg portion 14 pivotally attached to the seat portion 12 by a pivot 16. The seat portion 12 and leg portion 14 are preferably configured to be ergonomically shaped to fit to the corresponding contour of the body of the user.

The pivoting leg portion 14 includes a pair of tandem leg troughs 15. The leg troughs may be joined in the same piece of structure (FIG. 3), or may partially comprise separate leg components. The free end opposite the pivot 16 of the pivoting leg portion 14 has an upturned or curled snowplow configuration 17 to enable the device to easily ride over bumps and small obstacles in the path of the user during sledding or tobogganing. Of course, the curled end 17 may be associated with either the single or double pivoting leg embodiments of the invention shown in FIGS. 1 and 3 respectively.

With reference to FIGS. 1–4, a plurality of attachment straps 18 are provided to attach the seat portion 12 to the body of the user, and a series of hand holds 19 may also be included to help steer and stabilize the embodiments of the invention. The attachment straps 18, therefore, typically encircle the torso of the user to maintain the seat in an installed position.

With reference to FIG. 5, the bottom surface 42 of the various embodiments of the invention may include a series of ridges 44 to help with the invention maintain a straight line path of travel while sledding.

What is claimed is:

1. An apparatus to be worn during sledding comprising:

a seat portion having spaced apart sides;

a leg portion having spaced apart sides, a first end pivotally attached to the seat portion and a second curved end opposite the first, wherein the first end enables the leg portion to reciprocate between an operable sledding position and a walking position, and the second end enables the leg portion to ride over protuberances associated with the path of travel while sledding; and the leg portion further comprises a pair of spaced apart independently reciprocating leg troughs each of which is configured to receive one leg of the wearer; and the sled further includes a curved back section that is flexible and can move between a curved sledding position and a flat walking position with sled attachment members that attach to the midsection of the user so that the sled can be constantly attached to the user when sledding and walking.

2. The apparatus of claim 1, such that:

the leg portion and seat portion have an interior surface contour corresponding to the shape of the body of the wearer.

3. The apparatus of claim 1, further including:

at least one attachment strap having spaced apart ends attached to the spaced apart sides of the seat portion enabling the seat portion to be attached to the body of the wearer.

4. The apparatus of claim 3, wherein the at least one attachment strap comprises:

an attachment strap system configured to overlie the leg of the wearer and hold the seat portion adjacent the wearer's body.

5. The apparatus of claim 1, further including:

at least one hand hold formed in the spaced apart sides of the seat portion.

6. An apparatus to be worn during sledding comprising:

a seat component having spaced apart sides;

a leg component having two spaced apart leg troughs each of which is configured to receive a leg of the wearer; and a pivot enabling each of the two spaced apart leg troughs of to be pivotally attached to the seat component and reciprocate between an operable sledding position and a walking position; and the sled further includes a curved back section that is flexible and can move between a curved sledding position and a flat walking position, with sled attachment members that attach to the midsection of the user so that the sled can be constantly attached to the user when sledding and walking.

7. The apparatus of claim 6, wherein each leg trough further comprises:

a curved end opposite the end pivotally attached to the seat component enabling the each leg trough to ride over protuberances associated with the path of travel while sledding.

8. The apparatus of claim 6, such that:

the leg component and seat component have an interior surface contour corresponding to the shape of the body of the wearer.

9. The apparatus of claim 6, further including:

at least one attachment strap having spaced apart ends attached to the spaced apart sides of the seat component enabling the seat component to be attached to the body of the wearer.

10. The apparatus of claim 9, wherein the at least one attachment strap comprises:

an attachment strap system configured to overlie the leg of the wearer and hold the seat component adjacent the wearer's body.

11. A flexible sled configured like pants, comprising:

a seat having spaced apart sides;

two legs each of which is independently pivotally attached to the seat; and a pair of attachment straps provided to attach the sled to the body of a user wherein each strap has spaced apart ends that are attached to the spaced apart sides of the seat; and the sled further includes a curved back section that is flexible and can move between a curved sledding position and a flat walking position with sled attachment members that attach to the midsection of the user so that the sled can be constantly attached to the user when sledding and walking.

12. The sled of claim 11, such that:

the seat and legs form a single component and are made of a flexible resilient material.

13. The sled of claim 11, wherein the legs further include:

a curved end opposite the seat enabling the legs to ride over protuberances associated with the path of travel while sledding.

14. The sled of claim 11, such that:

the legs and seat have an interior surface contour corresponding to the shape of the body of the wearer.

15. The sled of claim 11, further including:

at least one hand hold formed in the spaced apart sides of the seat.

* * * * *